Patented Apr. 15, 1924.

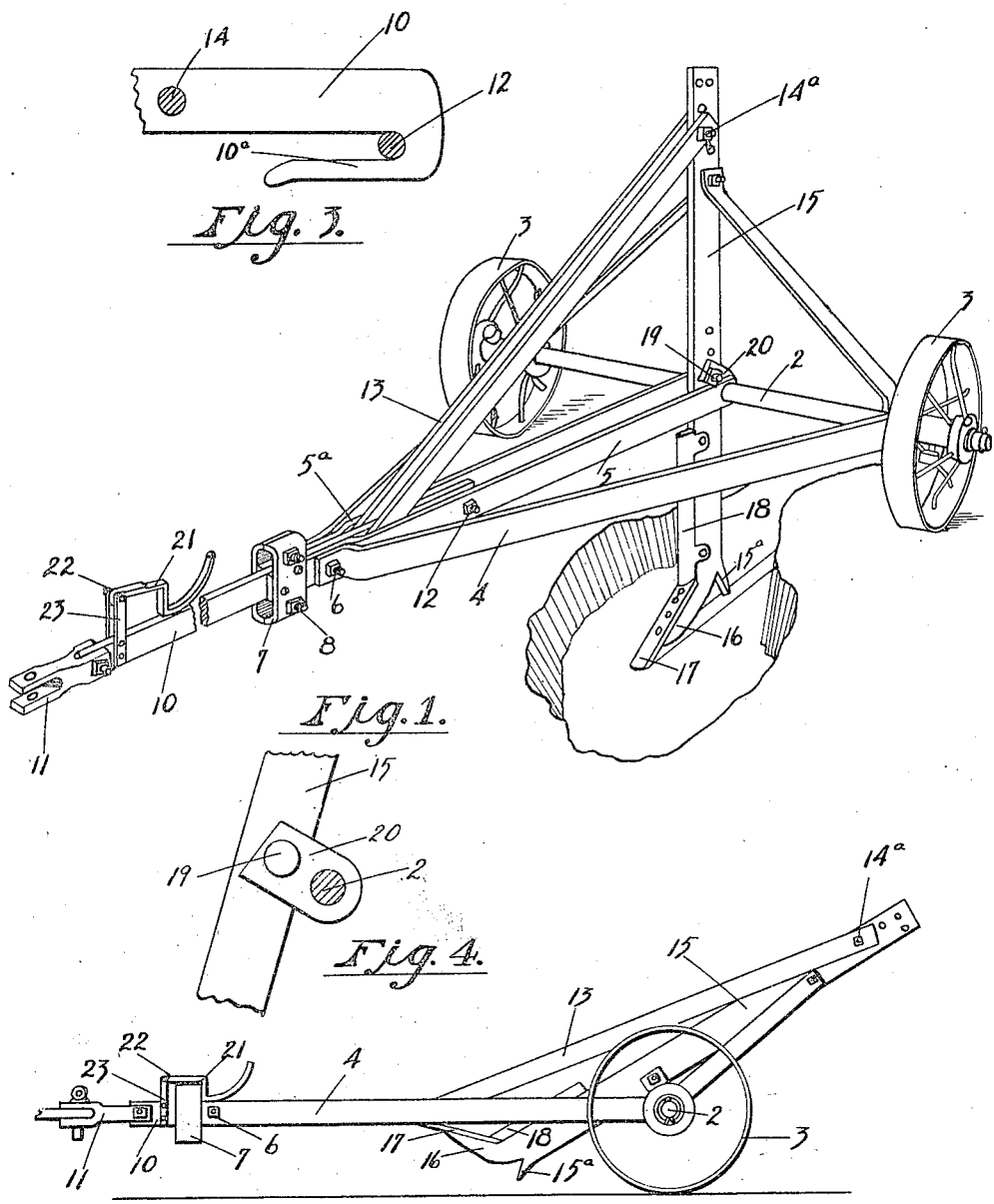

1,490,502

UNITED STATES PATENT OFFICE.

ANDREW J. BARNHART, OF PLACENTIA, CALIFORNIA.

SUBSOIL PLOW.

Application filed September 22, 1922. Serial No. 589,845.

*To all whom it may concern:*

Be it known that I, ANDREW J. BARNHART, a citizen of the United States, residing at Placentia, in the county of Orange and State of California, have invented new and useful Improvements in Subsoil Plows, of which the following is a specification.

This invention relates to agricultural implements, and more particularly to subsoil plows, and has for its object to provide a subsoil plow including a bottom connected to the supporting frame in such manner that by a reverse pressure on the draft elements of the plow the plow bottom will be automatically lifted from effective position. It is also an object to provide means for automatically pulling the plow into effective plowing position.

Further objects and advantages will be made manifest in the following specification of an embodiment of the invention illustrated in the accompanying drawings, wherein—

Figure 1 is a perspective of the plow in operating position, the subjacent earth being broken away to indicate the position of the plow;

Figure 2 is a side elevation showing the plow beam in inoperative position;

Figure 3 is a detail showing the draft bar hook in engagement with the supporting pin;

Figure 4 is a detail showing the connection between the plow beam and the plow axle.

The implement as here shown includes a substantially transverse axle 2 having ground wheels 3 at its ends and on the axle is mounted a substantial frame consisting of forwardly convergent side members 4 and inner parallel guide members 5, the rear ends of which are mounted on the axle 2. The forward ends of the frame members 4 and 5 are fastened, as by bolts 6, to each other, and the projecting ends of the inner members 5 are provided with a flat loop 7 extending perpendicularly. The loop is shown as made of sections which are bolted as at 8. This loop provides a spacing means for the front elements of the frame so that there may slide between the inner members 5 a draft bar 10, the front end of which is provided with a shackle 11 to be connected to any suitable implement or draft means. The rear end of the draft bar 10 is provided with a hook 10ª and this is adapted when the bar is pulled forwardly between the guide members 5 to engage a stop bolt or pin 12, passing through the guide members.

These guide members are slightly offset as at 5ª, Figure 1, to permit the attachment of the lower ends of links 13 to the draft bar 10, as by a bolt or other pivot forming part 14. The upper ends of the links 13 are pivotally connected by adjustable means, as a bolt 14ª, to the upper end of a plow beam 15. The lower end of this beam is designed for subsoil cutting and has a forwardly extending toe 16 which may be provided with a removable cutter or plate 17. Along the forward edge of the lower end of the beam is secured an upright cutter 18. The plow beam 15 is pivotally connected at 19 to short links 20 which, in turn, are pivotally mounted on the axle 2, Figure 4.

The implement is adapted to be moved from place to place with the cutters held in inoperative position and with the plow beam 15 thrown to an inclined position, as shown in Figure 2, at which time a hook or latch 21 which is pivoted at 22 on bracket 23 of the draft bar 10 is in holding engagement with the contiguous upper end of the frame loop 7. It will be seen that the draft bar 10 is, therefore, in a telescoped position between the guide members 5 of the frame, and the links 13 are tilted downwardly and support the tilted plow beam 15 at such an angle that the cutters are lifted above the plane of the ground.

In order to set the subsoiler in operating position, the latch member 21 is tripped to release the frame and when tension is placed on the draft bar 10 this tends to pull forwardly from the frame structure of the plow, with the result that the cutting members of the plow bottom are shifted downward toward the ground. The plow beam may be provided at its lower end with a heel 15ª designed to quickly penetrate the soil surface and hold the plow beam as the draft bar pulls forwardly, which will result in the movement of the plow beam to the vertical position. Further forward movement of the implement causes the cutters 17 and 18 to dig down into the ground until the plow beam assumes the vertical position defining the depth and normal plane of the cut.

From the above, it will be seen that the plow bottom can be readily pulled from the cutting position by reverse movement of the draft bar 10 so that it will slide back into the frame and push the links 13, which will throw down the plow beam 15, thus lifting the cutters from the soil. As the draft member 10 reaches its rearmost position, it is automatically latched by the action of the latch 21, and then the implement can be pulled forwardly with the plow still held in ineffective position.

Further embodiments, modifications and variations may be resorted to within the scope of the invention as claimed.

What is claimed is:

1. A wheeled subsoiler consisting of a wheeled frame having an axle, a plow beam pivotally mounted on the axle of the frame, a slidable draft bar mounted on the frame, and a rigid link connecting the draft bar and the plow beam whereby the latter can be shifted to upright position to locate the plow bottom in cutting position in the soil and whereby the plow beam can be tilted to lift the plow bottom from cutting position.

2. A subsoiler consisting of a wheeled frame having an axle, a plow beam pivotally mounted on the axle of the frame, a slidable draft bar mounted on the frame, parallel links connecting the draft bar and the plow beam whereby the latter can be shifted to an upright position to locate the plow bottom in cutting position in the soil and whereby the plow beam can be tilted to lift the plow bottom from cutting position, and means for latching the parts to hold the plow bottom in ineffective position.

3. A wheeled subsoiler consisting of a wheeled frame, a plow beam pivotally mounted as to the frame, a slidable draft bar mounted on the frame, connections between the draft bar and the plow beam whereby the latter can be shifted to an upright position to locate the plow bottom in cutting position in the soil and whereby the plow beam can be tilted to lift the plow bottom from cutting position, the draft bar having a tail hook and a stop engageable thereby for limiting the forward movement of the plow beam.

4. A subsoiler comprising, in combination, a wheeled axle, a frame mounted on the axle, a draft bar slidably mounted in the frame, and a plow beam carrying a subsoil plow bottom and operatively connected to the draft bar whereby the latter will shift the plow beam to bring the plow bottom into effective and ineffective positions, said beam being pivotally attached to the axle.

In testimony whereof I have signed my name to this specification.

ANDREW J. BARNHART.